United States Patent
Wiemker et al.

(10) Patent No.: US 8,315,963 B2
(45) Date of Patent: Nov. 20, 2012

(54) AUTOMATED HIERARCHICAL SPLITTING OF ANATOMICAL TREES

(75) Inventors: Rafael Wiemker, Kisdorf (DE);
Thomas Buelow, Grosshansdorf (DE);
Roland Opfer, Hamburg (DE)

(73) Assignee: Koninnklijke Philips Electronics N.V., Eindhoven (NL)

( * ) Notice: Subject to any disclaimer, the term of this patent is extended or adjusted under 35 U.S.C. 154(b) by 880 days.

(21) Appl. No.: 12/304,784

(22) PCT Filed: Jun. 11, 2007

(86) PCT No.: PCT/IB2007/052192
§ 371 (c)(1),
(2), (4) Date: Dec. 15, 2008

(87) PCT Pub. No.: WO2007/144815
PCT Pub. Date: Dec. 21, 2007

(65) Prior Publication Data
US 2009/0177444 A1   Jul. 9, 2009

(30) Foreign Application Priority Data
Jun. 16, 2006   (EP) .................................... 06115588

(51) Int. Cl.
G06F 17/00 (2006.01)
G06N 5/00 (2006.01)
(52) U.S. Cl. ............................................................ 706/45
(58) Field of Classification Search .................. 706/45, 706/48
See application file for complete search history.

(56) References Cited

U.S. PATENT DOCUMENTS

| | | | |
|---|---|---|---|
| 2003/0166999 A1* | 9/2003 | Liu et al. ........................ | 600/410 |
| 2006/0023925 A1* | 2/2006 | Kiraly et al. .................... | 382/128 |
| 2006/0056685 A1 | 3/2006 | Kiraly et al. | |

FOREIGN PATENT DOCUMENTS

| | | |
|---|---|---|
| EP | 1225541 A2 | 7/2002 |
| WO | 03034337 A2 | 4/2003 |
| WO | 2005057491 A1 | 6/2005 |

OTHER PUBLICATIONS

Chen et al, "A tree-branch searching, multiresolution approach to skeletonization for virtual endoscopy", Proc. of SPIE 2000; 3979:726-734.*

Yu et al, "System for 3D Visualization and Data Mining of Larage Vascular Trees", Proceedings of SPIE vol. 6016, Nov. 2005, pp. 1-15.

(Continued)

Primary Examiner — Alan Chen
Assistant Examiner — Ilya Traktovenko

(57) ABSTRACT

A method for splitting a dataset relating to an anatomical tree structure (12) comprises establishing a plurality of seed points (24) within the tree structure; establishing a length of a path (20) along the tree structure from each of the plurality of seed points (24) to each of a plurality of other points (14); establishing a Euclidean distance (26) from each of the plurality of seed points (24) to each of the plurality of other points (14); associating with the seed point (24) a measure representing a likelihood that the seed point is the root point in dependence on the established lengths (20) and distances (26); identifying the root point of the tree structure (12) as the seed point (24) associated with a maximum measure representing the likelihood that the respective seed point is the root point; and establishing the principal bifurcation point (64) in dependence on the root point.

20 Claims, 6 Drawing Sheets

OTHER PUBLICATIONS

Wan et al, "Multi-Generational Analysis and Visualization of the Vascular Tree in 3D Micro-CT Images", Computers in Biology and Medicine, vol. 32, No. 2, Mar. 2002, pp. 55-71.

Mori et al, "Automated Anatomical Labeling of the Bronichial Branch and Its Application to the Virtual Bronchoscopy System", IEEE Transactions on Medical Imaging, vol. 19, No. 2, Feb. 1, 2000, pp. 103-114.

Selle et al, "Analysis of Vasculature for Liver Surgical Planning", IEEE Transactions on Medical Imaging, vol. 21, No. 11, Nov. 2002, pp. 1344-1357.

Herman et al, "Tree Visualisation and Navigation Clues for Information Visualisation", Computer Graphics Forum, vol. 17, No. 2, 1998, pp. 153-165.

* cited by examiner

AUTOMATED HIERARCHICAL SPLITTING OF ANATOMICAL TREES

The invention relates to a method for splitting an anatomical tree structure represented by a data set identifying points of the anatomical tree structure. The invention also relates to a system and to a computer program product.

WO 03/034337 discloses a method of analyzing an object data set in which a tubular structure having a plurality of branches and bifurcations occurs, wherein said object data set assigns data values to positions in a multi-dimensional space, which data values relate to an object to be examined, and wherein the positions along the branches and of the bifurcations of said tubular structure are labeled, each branch and bifurcation having a unique label. In order to improve accuracy when applying the method particularly for fully-automated vessel tracing, particularly in the vessel structure of the brain of a patient, the following steps are proposed: selecting a starting point in or near a branch or bifurcation of interest of the tubular structure, orienting a probe comprising a sphere and a plane through the center of the sphere around said starting point such that the plane goes through said starting point, adjusting the orientation of the probe such that the plane is orthogonal to the tubular structure and that the center of the sphere is on the central axis of the tubular structure, thereby using surface vertices inside the sphere, said surface vertices being labeled according to the label of the nearest position along the branches and of the bifurcations, wherein only surface vertices are used for adjusting the orientation of the probe having a label equal to the label of the branch or bifurcation of interest or of the next bifurcation or extremity along the branch of interest.

The known method provides a labeling of branches and bifurcations as a processing step in a quantitative vessel analysis algorithm.

It is an object of the invention to provide an improved method for inspecting an anatomical tree structure. This object is realized by providing a method comprising finding a root point (48) indicative of a main inflow and/or outflow of the anatomical tree structure;
finding a principal bifurcation point (64) bounding two major subtrees of the anatomical tree structure in dependence on the root point; and
splitting the anatomical tree structure at the principal bifurcation point.

The data set may be represented by a data set identifying points of the anatomical tree structure. The points are points in a multi-dimensional space, usually a three-dimensional space, as the human body is three-dimensional in nature. A two-dimensional space applies for example if the three-dimensional dataset is projected onto a two-dimensional plane. A four-dimensional space applies for example when the dimension of time is also included.

The principal bifurcation point joins two major subtrees as will be explained hereinafter. By first finding the root point and then finding the principal bifurcation point, it becomes possible to identify relevant subtrees at each bifurcation point, which is important for deciding about the importance of the bifurcation point. The two major subtrees may have a relatively high probability of having a particular anatomical meaning, for example the subtrees may feed different organs or different lobes of the same organ.

In general, the root point plays an important role in identifying a principal bifurcation point. Multiple principle bifurcation points can be hierarchically determined, where principal bifurcation points closer to the root point are usually higher in the hierarchy than principal bifurcation points further away from the root point.

The principal bifurcation point can be used as a split point for splitting the hierarchical tree at a position that has anatomical meaning. For example, it can split a vascular tree in portions that each feed a different lobe of an organ such as a kidney or a lung. In case of a tree structure representing a bronchial tree, the principal bifurcation point can be used to identify the portions of the bronchial tree that deliver the air to the different lobes of the lung. The invention makes it easier for a clinical user to distinguish the important portions of the tree, as the split point is indicated automatically.

In an embodiment, the step of finding the root point comprises:
selecting a plurality of seed points (24) within the tree structure;
computing a length of a path (20) along the tree structure from each of the plurality of seed points (24) to each of a plurality of other points (14);
computing a distance (26) from each of the plurality of seed points (24) to each of the plurality of other points (14);
computing for each seed point (24) a measure representing a likelihood that the seed point is the root point in dependence on the established lengths (20) and distances (26); and
identifying the root point of the tree structure (12) in dependence on the seed point (24) associated with a maximum measure representing the likelihood that the respective seed point is the root point.

This way of finding a root point uses the insight that a path from a root point to any other point is, on average, shorter than a path between any two random points.

In an embodiment, the step of identifying the root point comprises:
finding a leaf of the tree structure closest to the seed point (24) associated with a maximum measure representing the likelihood that the respective seed point is the root point; and
identifying the leaf as the root point.

Here, a leaf is an end point of the tree structure. The leaf closest to the seed point can be regarded as the leaf having a path to the seed point shorter than or at most equal to the path to any other leaf of the tree structure.

In an embodiment of the invention, the root point is identified as seed point (24) associated with a maximum measure representing the likelihood that the respective seed point is the root point. This is computationally more efficient.

An embodiment comprises identifying a set of candidate seed points bounded by a distance from the seed point that is currently a most likely root point according to the measure representing the likelihood;
selecting a point (30) for inclusion in the plurality of seed points from the set of candidate seed points; and
decreasing the distance.

Any heuristic optimization method can be used to find the most likely root point. An example optimization method is simulated annealing.

In an embodiment, the step of finding the principal bifurcation point comprises:
identifying a plurality of bifurcation points (64) of the anatomical tree structure;
computing for each identified bifurcation point (64) a measure relating to a part of the tree structure (66) that does not include the root point (48) and that is bounded by the respective bifurcation point (64); and
identifying the principal bifurcation point (64) as the bifurcation point of the plurality of bifurcation points with a maximum associated measure.

The principal bifurcation point is found by analyzing the part of the tree structure bounded by the principal bifurcation point that does not include the root point. The importance of a bifurcation point can be determined with respect to the root point. The measure relating to a part of the tree structure could comprise a volume or a length of vessels within the part of the tree structure. It could also comprise other values, for example a number of bifurcations within the part of the tree structure.

An embodiment comprises, for each bifurcation point of the plurality of bifurcation points:

distinguishing a plurality of subtrees (60, 62) joining at the bifurcation point;

computing sizes of each of the plurality of subtrees;

computing the measure relating to the part of the tree as a minimum of sizes of each of the plurality of subtrees.

A principal bifurcation point will in general divide the tree structure in at least two relatively large subtrees. Including the minimum of sizes of each of the plurality of subtrees helps avoiding that a bifurcation separating only a small subtree from a large subtree is erroneously identified as a principal bifurcation.

In an embodiment, the step of splitting the anatomical tree structure comprises:

distinguishing a plurality of subtrees (60, 62) joining at the principal bifurcation point (64); and rendering the tree structure such that at least one subtree of the plurality of subtrees can be distinguished by a person.

Other ways of splitting are realized by for example using the principal bifurcation point as an input for further computational processing steps, such as a computation and display of quantitative values such as the volume of the two subtrees joining at the principal bifurcation point.

The method is advantageously applied for visualization of the subtrees separated by the primary bifurcation. This could include rendering only one of the subtrees at a time, or rendering both subtrees in a different rendering area, and/or using different colors and/or textures for rendering each subtree. This makes it particularly easy to see the subtrees or to visualize for example a lobe of an organ. The method can be applied as well as a processing step for example in a vessel analysis package. For example, after identifying a principal bifurcation, a vessel analysis tool within the vessel analysis package could be applied to one of the identified subtrees.

An embodiment comprises enabling a user to select a subtree of the anatomical tree structure; and identifying a further principal bifurcation point as the bifurcation point of the plurality of bifurcation points with a maximum associated measure, taking into account only the bifurcation points of the plurality of bifurcation points located within the selected subtree.

This is a convenient way to quickly identify a certain part of an anatomical tree structure.

In some embodiments, the tree structure represents a vascular and/or bronchial tree of a human or animal body.

The invention applies to any type of anatomical tree structure occurring in human anatomy. The invention equally applies to any type of anatomical tree structure occurring in animals or plants.

In an embodiment, the dataset relates to a three-dimensional image volume dataset obtained by means of computed tomography, magnetic resonance imaging, 3D-X-ray, and/or ultrasound imaging.

An embodiment comprises means for finding a root point indicative of a main inflow and/or outflow of the anatomical tree structure;

means for finding a principal bifurcation point bounding two major subtrees of the anatomical tree structure in dependence on the root point; and means for splitting the anatomical tree structure at the principal bifurcation point.

An embodiment comprises instructions for causing a computer system to perform the method set forth.

These and other aspects of the invention will be further elucidated and described with reference to the drawing, in which.

Figure 1:
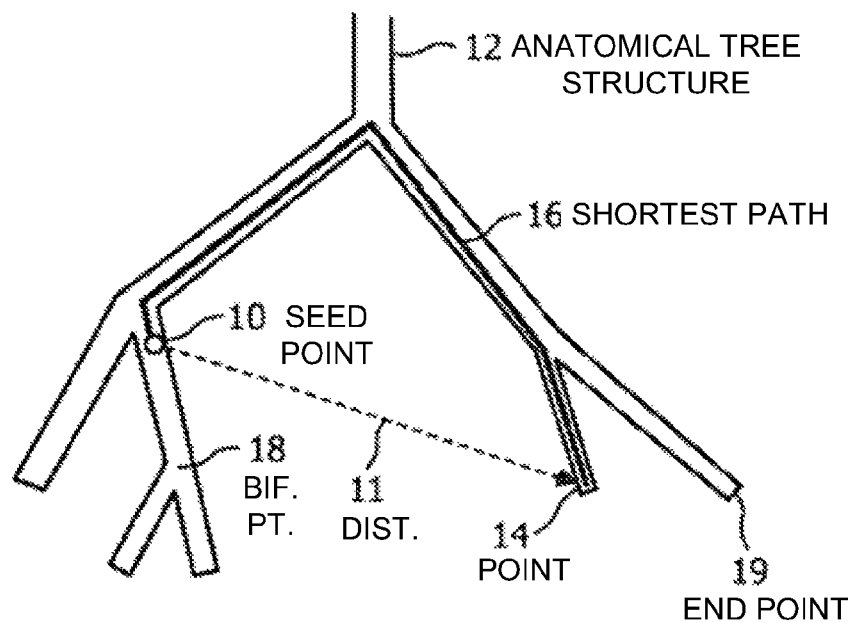
FIGS. 1 and 2 illustrate several aspects involved in finding a root point.

A vessel should be understood as a tubular structure conducting body fluid, in other words a duct that carries fluid, especially blood or lymph, around the body. Particular examples of vessels in this sense are the arteries and veins and the bronchia.

In the explanation of the embodiments, some techniques and words are mentioned that are known to those skilled in the art of 3D image analysis. For example, a tree structure typically comprises branches. The branches are joined at bifurcation points. An end point of a branch that is not joined at a bifurcation point may be called a leaf. One point in the tree is defined to be a root point. In the case of an anatomical tree representing for example a tubular structure, the root point is indicative of a main inflow and/or outflow of the structure. One way of identifying such a root point is by comparing the diameter of the tube at different points of the structure; the main inflow and/or outflow usually has the widest diameter. A more reliable way of identifying a root point is disclosed below. A subtree is a tree structure that is part of a larger tree structure. A dataset representing points of an anatomical tree structure may be provided in several ways. One way to represent such a dataset is by means of a volume dataset assigning values to volume elements (voxels). Typically different (ranges of) values are assigned to voxels representing part of a vessel and to voxels representing other tissues. Another way of representing an anatomical tree structure is by means of a list of discrete 3D points that are on the boundary between vessels and other tissues. This is known as a surface representation of the vessels. Other representations can also be used in combination with the invention as will be appreciated by the skilled artisan.

Region growing or voxel growing is a known technique used in segmentation and in image analysis in general. It can also be used to create an ordering of voxels or 3D points. The technique can also be used to identify a subset of voxels according to predefined criteria. Voxel growing algorithms typically start with a set containing one or more seed voxels. More voxels are added to the set in a sequential order. Only voxels satisfying predefined criteria are added. Usually, the main criterion is that a voxel to be added is a neighbor of a voxel already in the set, and the voxel to be added is part of a vessel. A neighbor of a voxel $V_1$ is defined as a voxel $V_2$ in a k-neighborhood of voxel $V_1$. The 26-neighborhood of a voxel $V_1$ is defined as the set of 26 voxels that are connected to $V_1$ at a face or edge. Instead of the 26-neighborhood, for example an 8-neighborhood can be used which contains the 8 voxels connected at a face. In prioritized voxel growing, voxels satisfying the criteria are added in a particular order. In voxel growing with lowest walking distance priority, the order in which voxels are added is defined by the length of a shortest path from a seed voxel to a voxel to be added via face and/or edge connected voxels already in the subset.

An embodiment of a method to split a given tree into two principal branches consists of two main parts: Finding a root of the tree, and finding a principal bifurcation of the tree, with respect to the root.

The first step, finding a root of the tree, proceeds as follows. A plurality of seed points may be selected by means of a random process, or based on user input. Alternatively, all voxels in the tree structure are included in the plurality of seed points. If some a priori knowledge is available about the tree structure at hand, the seed points may be selected based on an assumption about the location of the root point. Preferably seed points are selected close to the root point. For each seed point of the plurality of seed points, a cost function is computed representing a likelihood that this point is the tree root. Starting from the seed point, a voxel growing is started until all voxels of the entire structure have been visited. Preferably prioritized voxel growing with lowest walking distance priority is used to cope with possible cycles in the data structure. This defines a length of a path along the tree structure from the seed point to each of the other points in the tree structure. Other ways to compute a length of a path along the tree structure from the seed point to each of a plurality of other points are known to the person skilled in the art. For a plurality of voxels, the walking distance is compared to the shorter or equal flight distance (the Euclidean distance), and the cost function for this seed point is computed as $$\cos t = \Sigma(d_{walk} - d_{flight})$$

The cost function is associated with the seed point as a measure representing a likelihood that the seed point is the root point. The cost function becomes smallest for the root of an anatomical tree, in particular when the branches fan out nearly radially, and becomes high for seed points located far off in a branch of the tree, because many points in the tree can then only be reached using strong deviations from the flight line. The root point is thus identified as the seed point associated with a maximum measure among the plurality of seed points.

In principle, a root of the tree can be determined by computing the cost function for every voxel of the tree structure, and finding a point with smallest cost function. This corresponds to including all voxels in the plurality of seed points. A preferred embodiment uses the following scheme to reduce the number of computations required. The embodiment makes use of a method that is similar to simulated annealing. A (possibly random) starting point is included as a seed point in the plurality of seed points, and its cost function computed. Then, a random point is chosen which is at (most) a walking distance h from the current best point. The chosen point is included as a seed point in the plurality of seed points, and its cost function is computed. If the cost function value is lower, then the new point is adopted as the new current best point. This testing of random points at a distance h is repeated for a certain number of trials. Then, the distance h is gradually lowered, and process of trying random points repeated. The overall process is started with a high distance h, e.g. half of the tree size, and stopped when h is smaller then the desired spatial accuracy. Thus, the plurality of seed points is established gradually during the procedure rather then at the beginning. Several variations of schemes relating to simulated annealing, as well as other non-linear optimization methods that could be used in the process instead of simulated annealing, are known to those skilled in the art.

The second step, finding a principal bifurcation of the tree, follows the first step. Starting from the root point as a seed point, a (preferably prioritized) voxel growing (with lowest walking distance priority) is started until all vessel voxels of the tree structure have been visited. In a preferred embodiment, the voxel growing result of the first step is used to avoid unnecessary computations.

Figure 4:
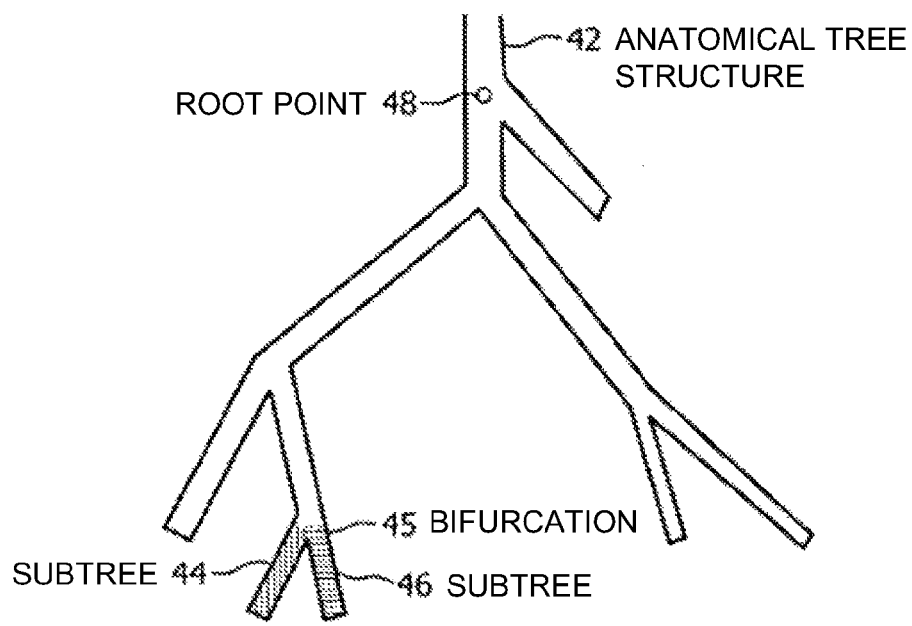
FIGS. 4-7 illustrate some subtrees joining at a bifurcation point.
Figure 5:
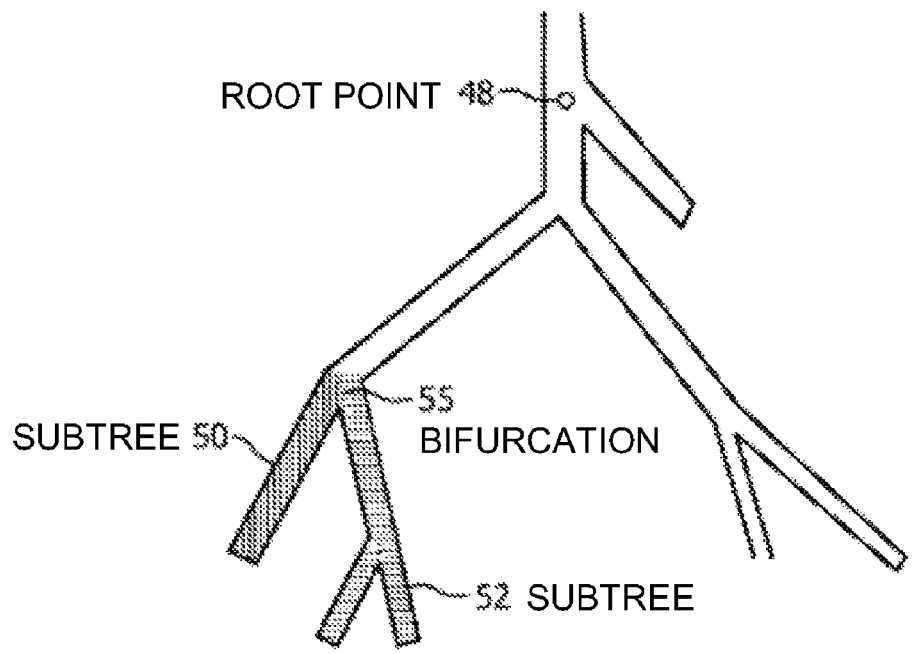
Figure 6:
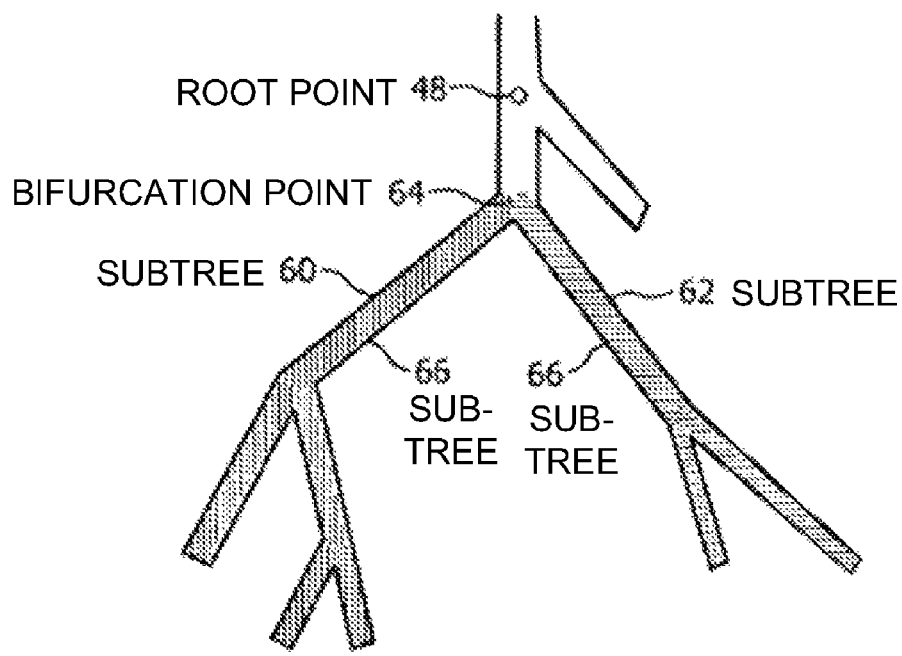
Figure 7:
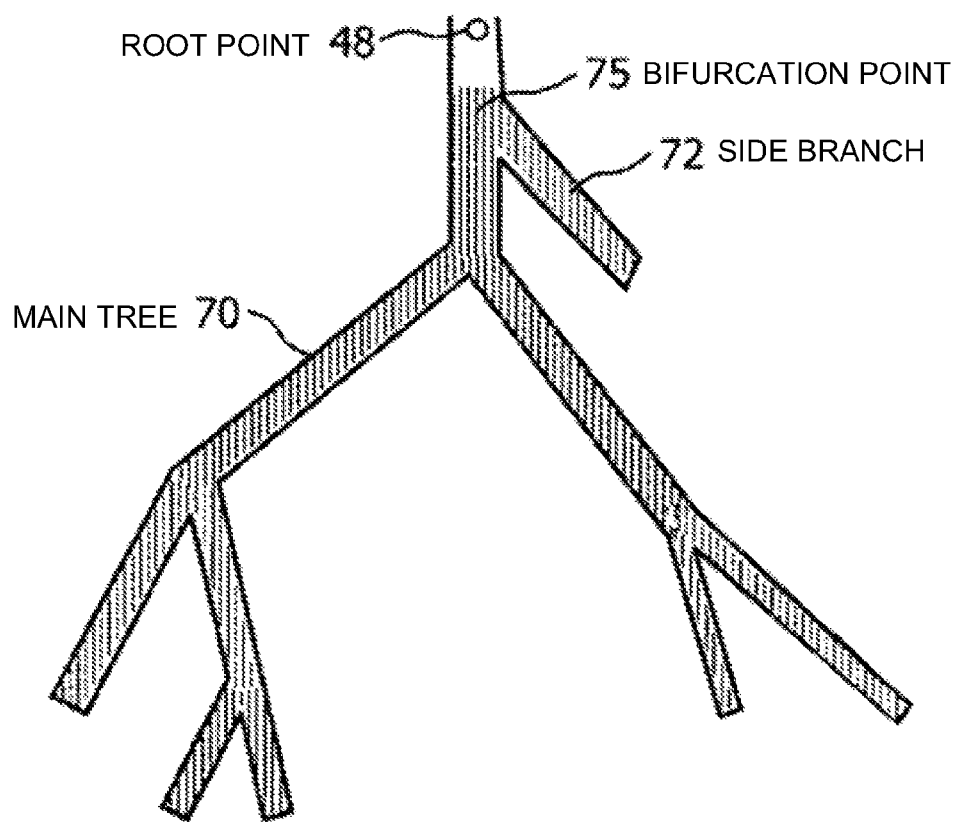

Starting with an empty set, one voxel after the other is added in decreasing order of walking distance as computed during the voxel growing process (see FIGS. 4-6). This can be done in an efficient way by forming a bin-sorted list of voxels. Each voxel that is added to the set is associated with a class. If the voxel to be added is in the neighborhood of at least one of the voxels in the set, it is associated with the same class as that voxel, otherwise a new class is created. Whenever a newly added voxel is in the neighborhoods of at least two voxels associated with different classes, it is said that this voxel merges two previously isolated classes, and this voxel is identified as a bifurcation point. The two merged classes form a part of the tree structure that does not include the root point and that is bounded by the respective bifurcation point. It does not include the root point, because the voxels are selected in order of their distance to the root point as computed during the voxel growing process, starting with the highest distances. The part of the tree structure is bounded by the bifurcation point, because it only includes voxels with higher distance from the root point than the bifurcation point itself.

A measure is associated with the bifurcation point, the measure relating to the part of the tree structure that does not include the root point and that is bounded by the respective bifurcation point.

As each of the classes merged by the bifurcation point represents a distinct subtree, it is possible to distinguish a plurality of subtrees joining at the bifurcation point. Sizes associated with each of the plurality of subtrees are computed. A major subtree may for example have a relatively large size. For example, a number of voxels of the subtree can be used as the size, or a number of bifurcations in the subtree. The measure associated with the bifurcation point is then computed as a minimum of sizes of each of the plurality of subtrees. In other words, the size of the smaller one of the two merging classes is associated with the bifurcation point, $m = MIN(v1, v2)$, and a new merged class is formed.

After all voxels have been merged into a single class, the principal merger (i.e., the principal bifurcation point) is determined as the one with the largest associated measure $m = MIN(v1, v2)$. This max-min-principle ensures, that a small branch which merges to a large branch is not taken for a principal bifurcation.

Figure 2:
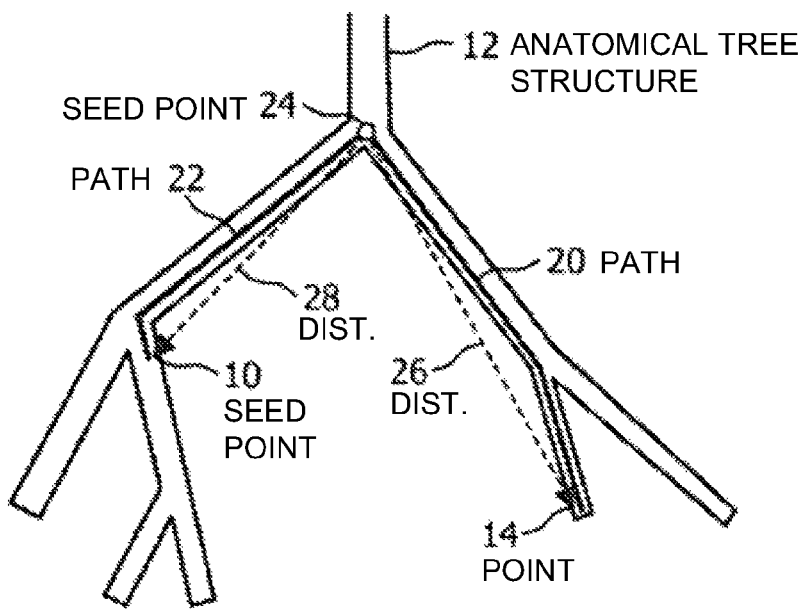
Figure 8:
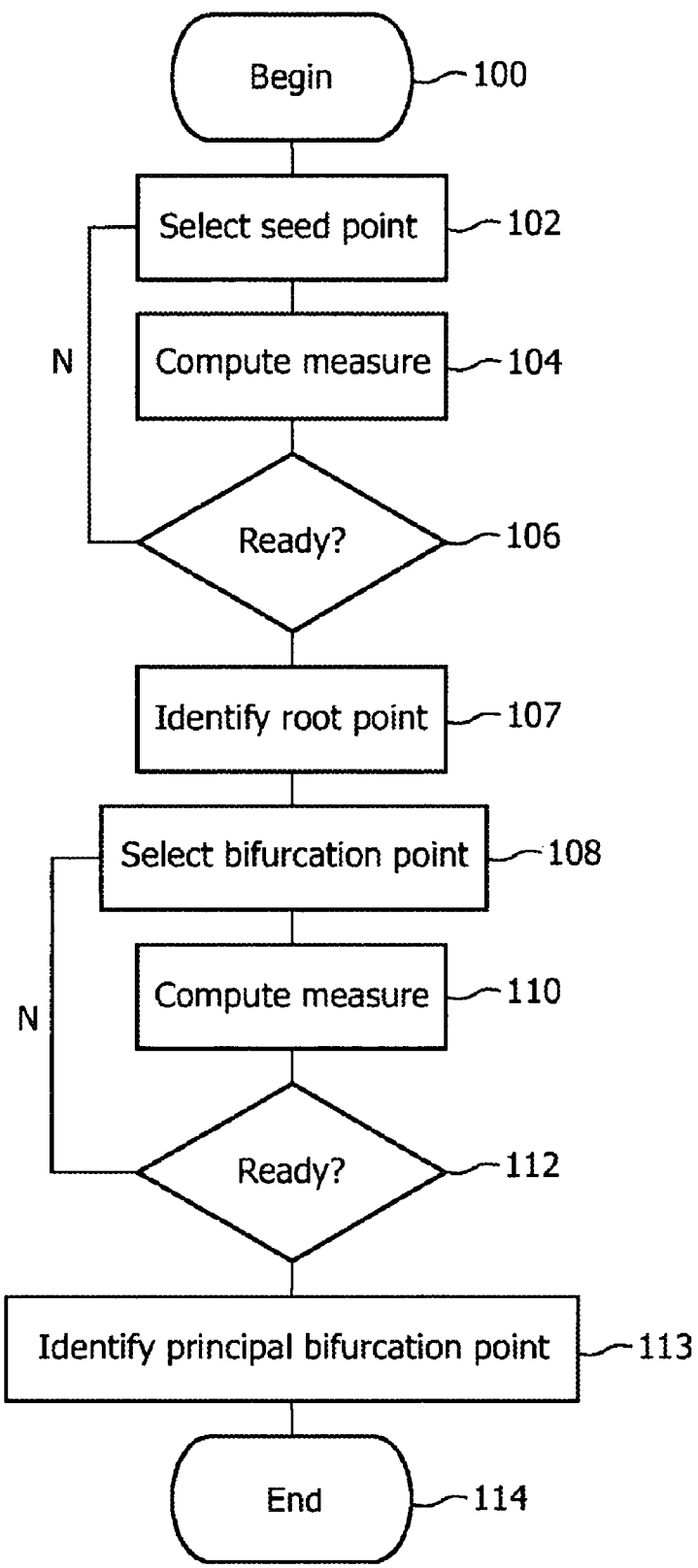
FIG. 8 shows a flow chart illustrating several steps of a method according to the invention.

These and other embodiments will be further explained with reference to FIGS. 1-7 and the flow chart (beginning with step 100 and ending with step 114) of FIG. 8. When an object appears in multiple figures, the same reference numerals have been used to identify it. FIGS. 1 and 2 illustrate several steps in the algorithm to find a root point. An anatomical tree structure (12) usually represents a tubular structure in a human organ or the human body in general. Such tubular structures appear in humans and animals in several forms, including arteries, veins, bronchia, and lymph vessels. The tubular structures are used to transport fluids (including liquids and gases) to and from the organs and to distribute the fluids within the organs. The anatomical tree structure can usually be divided into several subtree structures. In many cases, an organ or a lobe of an organ is served by a single or a small number of subtrees. In this case and in other cases it has medical relevance to visualize these subtrees separately for purposes of medical diagnosis and treatment planning. To enhance the clinical workflow, it is advantageous to identify the subtree(s) automatically, without user interaction or with minimal user interaction. To that end, a root of the tree is identified, and split points are determined relative to the root point. The split point identifies a root point of a (potentially) important subtree of the anatomical tree structure.

In a preferred embodiment, the root point (24) is determined by iteratively computing a cost function value associated with a seed point (10). Seed points can be determined (step 102), for example, in one (or a combination) of the following ways:

Each voxel is a seed point.

A number of seed points is evenly distributed along the tubular structure (12).

All bifurcation points (18) are seed points.

All end points (19) are seed points (preferred).

Bifurcation and end points can be determined as part of a voxel growing algorithm, also known as region growing or front propagation. Whenever the front splits in two fronts (not voxel connected), a bifurcation is detected. Whenever the front cannot grow any more, an end point is detected. Several refinements of bifurcation and end point detection are known to those skilled in the art. In case the tubular structure is not represented by voxels but by means of another representation, seed points can still be selected, for example analytically, in one of the ways indicated above.

Figure 3:
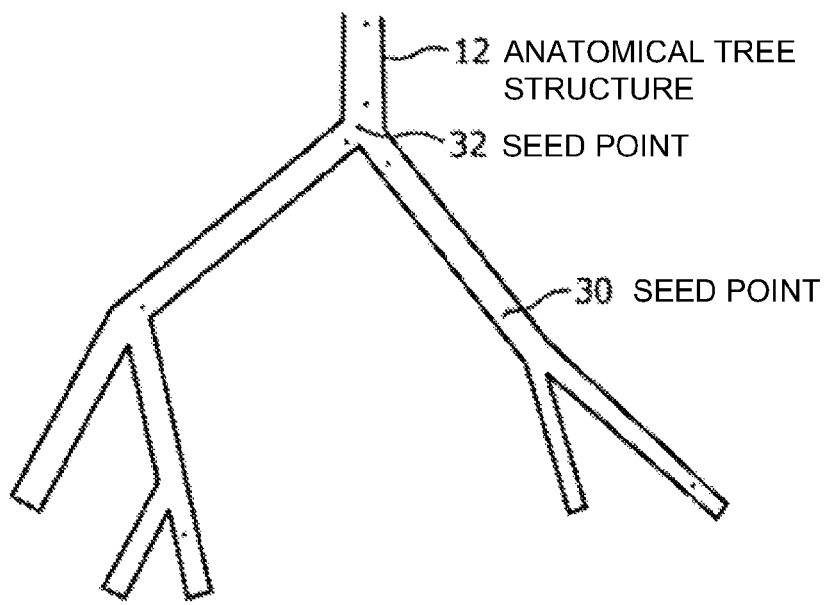
FIG. 3 illustrates some candidate root points.

In another embodiment, illustrated in FIG. 3, seed points (30, 32) are selected iteratively (steps 106 and 102), based on the computed cost function values of previous seed points. Preferably, new seed points are selected close to previous seed points with an associated cost function indicating a high likelihood that the point is a proper root point. A simulated annealing algorithm can be used for example.

The cost function can be computed as follows (step 104). A (shortest) path (16) is determined along the anatomical tree structure (12) from the seed point (10) to another point (14). A length of the shortest path (16) is compared to a distance (11) from the seed point (10) to the other point (14). The comparison can be implemented for example as a difference or a quotient of the two values. This procedure is repeated for a plurality of other points (14). The 'other points' are selected from the anatomical tree structure and kept fixed during the algorithm. For example, every voxel can be used as an 'other point' or they can be selected for example in a way similar to the selection of seed points.

The results of the comparisons are combined (for example by addition or multiplication) to determine a measure representing a likelihood that the seed point is the root point. This measure is determined for the plurality of seed points so that the final root point can be identified (in step 107) as the seed point (24) associated with a maximum measure representing the likelihood that the respective seed point is the root point.

After identifying the root point, the next step is to establish a principal bifurcation (the split point). In a relatively simple embodiment, the root point (24) is established as the principal bifurcation point. A more advanced embodiment is illustrated in FIGS. 4-7. Whether a bifurcation point (64) is a principal bifurcation point is determined by analyzing the subtree (66) below the bifurcation point. This subtree (66) is determined with respect to the root point (48) as a part of the tree structure (66) that does not include the root point (48) and that is bounded by the bifurcation point (64). This results in a measure correlated with a likelihood that the bifurcation point is a principal bifurcation point. The measure is computed (in step 110) for a plurality of bifurcation points (selected in step 108), and the bifurcation associated with a maximum measure is identified as the principal bifurcation point. The measure is for example computed based on a number of bifurcations in the subtree or based on a complexity measure of the subtree.

In a preferred embodiment, a plurality of subtrees (60, 62) joining at the bifurcation point (64) is distinguished. Only subtrees not including the seed point are evaluated. A subtree in this sense may be defined for example as a part of the tree bounded by the bifurcation point (64) and the end points (also called 'leaves') of the tree. A size related value is associated with each of the subtrees. The measure associated with the bifurcation point (step 110) is taken as the smallest one of the size related values. This procedure is repeated for all relevant bifurcation points (steps 112 and 108). For example, subtrees 44 and 46 are involved in the computation of the measure associated with bifurcation 45. Subtrees 50 and 52 are involved in the computation of the measure associated with bifurcation 55. Subtrees 60 and 62 are involved in the computation of the measure associated with bifurcation 64. Finally, subtrees 70 and 72 are involved in the computation of the measure associated with bifurcation 75.

The bifurcation point with the maximum associated measure is identified as the principal bifurcation point in step 113:

$$m(B_p) = \max_{B \in bifurcation\ points} (m(B)) = \max_{B \in bifurcation\ points} [\min(size(subtr_1(B)), size(subtr_2(B)))],$$

where $B_p$ is the principal bifurcation point, m(B) is the measure associated with a bifurcation point B, and $subtr_1(B)$ and $subtr_2(B)$ are the at least two subtrees bounded by bifurcation B. The max-min formulation ensures that a bifurcation point 75 which separates only a small side-branch 72 from the main tree 70 is not selected as the principal bifurcation point. Rather, a bifurcation point 64 which separates two large subtrees 60 and 62 is selected as the principal bifurcation point.

In an embodiment of the invention, rendering means is provided for rendering the anatomical tree structure, using for example a medical workstation, for further analysis by a physician. Advantageously the rendering is performed such that at least one subtree of the plurality of subtrees can be distinguished by a person. The user can then provide input to identify a second principal bifurcation point in one of the subtrees joining at one of the previously detected principal bifurcation points. The seed point does not have to be computed again, as it is also valid for any secondary primary bifurcation points. Also the measures m(B) do not have to be computed again if they have been stored after computation. The measures associated with bifurcations in the user-selected subtree can be compared, and the subtree can be split at the bifurcation point with maximum associated measure.

Figure 9:
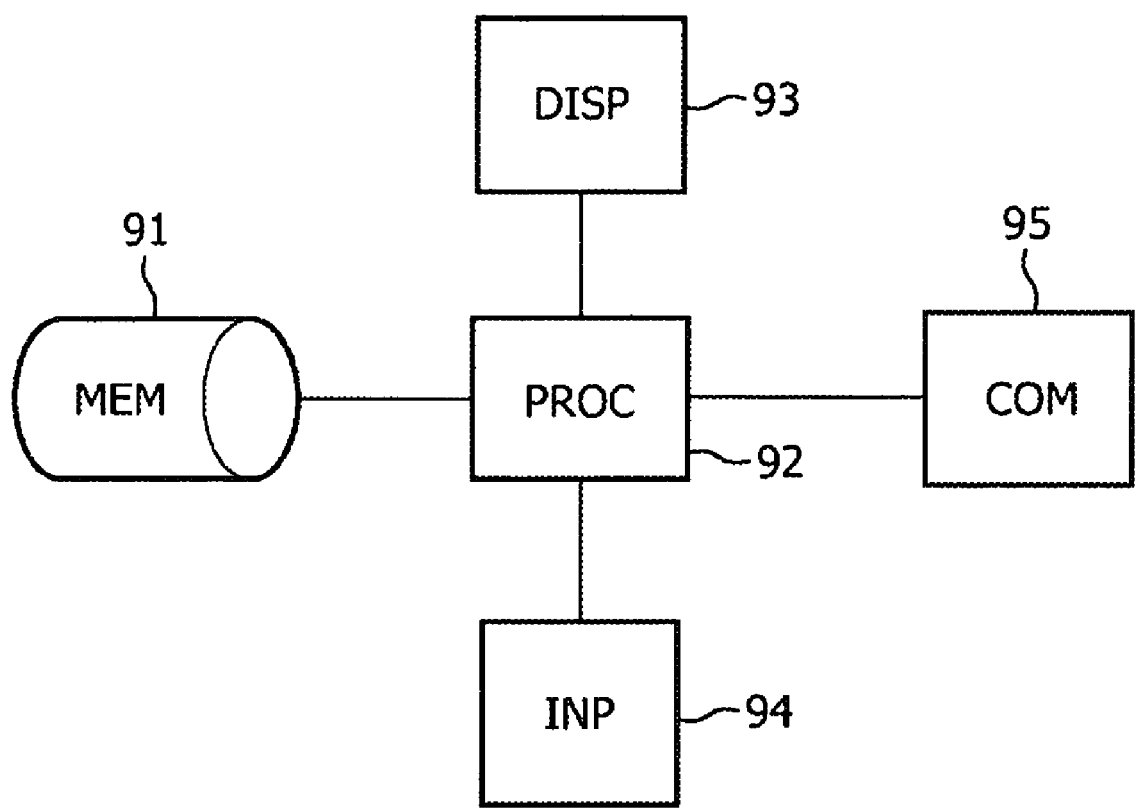
FIG. 9 is a diagram of an embodiment of the invention.

FIG. 9 illustrates hardware elements involved in an embodiment of the invention. The communications port 95 is used for receiving image data from a PACS system or from a medical imaging modality such as CT or MRI. The image data are processed by processor 92 and the processed and/or raw data are stored temporarily in memory 91. Display 93 is used for rendering the data. If the data has the structure of an anatomical tree, the method as set forth can be applied by causing the processor 92 to apply appropriate instructions. The anatomical tree is rendered on display 93, and for example the physician can indicate a part requiring further inspection by means of user input 94. The user can for example click on the applicable part of the anatomical tree structure using a mouse device, or the user can select one of a number of pre-computed major subtrees. The processor can apply an appropriate split by highlighting the applicable part of the anatomical tree structure and/or remove the non-applicable part of the anatomical tree structure. The processor is also arranged for finding the root point and/or principal bifurcation point(s) as set forth.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for splitting an existing anatomical tree structure represented by a data set identifying points of the anatomical tree structure, comprising:
    finding a root point indicative of a main inflow and/or outflow of the existing anatomical tree structure, wherein the existing anatomical tree structure was previously grown using a anatomical tree structure growing algorithm;
    finding a principal bifurcation point bounding two major subtrees of the existing anatomical tree structure in dependence on the root point by starting at a leaf end of the tree structure and moving towards the root point along the existing anatomical tree structure to find the bifurcation point with a maximum size measure; and
    splitting the existing anatomical tree structure into a plurality of subtrees at the principal bifurcation point.

2. The method according to claim 1, wherein the step of finding the root point comprises:
    selecting a plurality of seed points within the tree structure;
    computing a length of a path along the tree structure from each of the plurality of seed points to each of a plurality of other points;
    computing a distance from each of the plurality of seed points to each of the plurality of other points;
    computing for each seed point a measure representing a likelihood that the seed point is the root point in dependence on the established lengths and distances; and
    identifying the root point of the tree structure in dependence on the seed point associated with a maximum measure representing the likelihood that the respective seed point is the root point.

3. The method according to claim 2, wherein the step of identifying the root point comprises:
    finding a leaf of the tree structure closest to the seed point associated with a maximum measure representing the likelihood that the respective seed point is the root point; and
    identifying the leaf as the root point.

4. The method according to claim 2, further comprising:
    identifying a set of candidate seed points bounded by a distance from the seed point that is currently a most likely root point according to the measure representing the likelihood;
    selecting a point for inclusion in the plurality of seed points from the set of candidate seed points; and
    decreasing the distance.

5. The method according to claim 1, wherein the step of finding the principal bifurcation point comprises:
    identifying a plurality of bifurcation points of the anatomical tree structure;
    computing for each identified bifurcation point a measure relating to a part of the tree structure that does not include the root point and that is bounded by the respective bifurcation point; and
    identifying the principal bifurcation point as the bifurcation point of the plurality of bifurcation points with the maximum size measure associated measure.

6. The method according to claim 5, further comprising, for each bifurcation point of the plurality of bifurcation points:
    distinguishing a plurality of subtrees joining at the bifurcation point;
    computing sizes of each of the plurality of subtrees;
    computing the measure relating to the part of the tree as a minimum of sizes of each of the plurality of subtrees.

7. The method according to claim 1, wherein the step of splitting the anatomical tree structure comprises:
    distinguishing a plurality of subtrees joining at the principal bifurcation point; and
    rendering the tree structure such that at least one subtree of the plurality of subtrees can be distinguished by a person.

8. The method according to claim 7, further comprising:
    enabling a user to select a subtree of the anatomical tree structure; and
    identifying a further principal bifurcation point as the bifurcation point of the plurality of bifurcation points with a maximum associated measure, taking into account only the bifurcation points of the plurality of bifurcation points located within the selected subtree.

9. The method according to claim 1, wherein the tree structure represents a vascular tree of a human or animal body.

10. The method according to claim 1, wherein the tree structure represents a bronchial tree of a human or animal body.

11. The method according to claim 1, wherein the dataset relates to a three-dimensional image volume dataset obtained by means of computed tomography, magnetic resonance imaging, 3D-X-ray, and/or ultrasound imaging.

12. A system for splitting an anatomical tree structure represented by a data set identifying points of the anatomical tree structure, comprising:
- means for finding a root point indicative of a main inflow and/or outflow of the anatomical tree structure, wherein the existing anatomical tree structure is previously grown using a anatomical tree structure growing algorithm;
- means for finding a principal bifurcation point bounding two major subtrees of the anatomical tree structure in dependence on the root point by starting at a leaf end of the tree structure and moving towards the root point along the existing anatomical tree structure to find the bifurcation point with a maximum size measure; and
- means for splitting the anatomical tree structure into a plurality of subtrees at the principal bifurcation point.

13. A system, comprising:
- a processor that performs a method for splitting an existing anatomical tree structure represented by a data set identifying points of the anatomical tree structure, by:
- finding a root point indicative of a main inflow and/or outflow of the existing anatomical tree structure, wherein the existing anatomical tree structure was previously grown using a anatomical tree structure growing algorithm;
- find a principal bifurcation point bounding two major subtrees of the existing anatomical tree structure in dependence on the root point by starting at a leaf end of the tree structure and moving towards the root point along the existing anatomical tree structure to find the bifurcation point with a maximum size measure; and
- splitting the existing anatomical tree structure into a plurality of subtrees at the principal bifurcation point.

14. The system of claim 13, wherein the processor finds the root point by:
- selecting a plurality of seed points within the tree structure;
- computing a length of a path along the tree structure from each of the plurality of seed points to each of a plurality of other points;
- computing a distance from each of the plurality of seed points to each of the plurality of other points;
- computing for each seed point a measure representing a likelihood that the seed point is the root point in dependence on the established lengths and distances; and
- identifying the root point of the tree structure in dependence on the seed point associated with a maximum measure representing the likelihood that the respective seed point is the root point.

15. The system of claim 14, wherein the processor identifies the root point by:
- finding a leaf of the tree structure closest to the seed point associated with a maximum measure representing the likelihood that the respective seed point is the root point; and
- identifying the leaf as the root point.

16. The system of claim 14, wherein the processor further performs the method by:
- identifying a set of candidate seed points bounded by a distance from the seed point that is currently a most likely root point according to the measure representing the likelihood;
- selecting a point for inclusion in the plurality of seed points from the set of candidate seed points; and
- decreasing the distance.

17. The system of claim 14, wherein the processor finds principal bifurcation point by:
- identifying a plurality of bifurcation points of the anatomical tree structure;
- computing for each identified bifurcation point a measure relating to a part of the tree structure that does not include the root point and that is bounded by the respective bifurcation point; and
- identifying the principal bifurcation point as the bifurcation point of the plurality of bifurcation points with the maximum size measure associated measure.

18. The system of claim 17, wherein the processor, for each bifurcation point of the plurality of bifurcation points, finds principal bifurcation point by:
- distinguishing a plurality of subtrees joining at the bifurcation point;
- computing sizes of each of the plurality of subtrees;
- computing the measure relating to the part of the tree as a minimum of sizes of each of the plurality of subtrees.

19. The system of claim 13, wherein the processor splits the anatomical tree structure by:
- distinguishing a plurality of subtrees joining at the principal bifurcation point; and
- rendering the tree structure such that at least one subtree of the plurality of subtrees can be distinguished by a person.

20. The system of claim 19, wherein the processor splits the anatomical tree structure by:
- enabling a user to select a subtree of the anatomical tree structure; and
- identifying a further principal bifurcation point as the bifurcation point of the plurality of bifurcation points with a maximum associated measure, taking into account only the bifurcation points of the plurality of bifurcation points located within the selected subtree.

* * * * *